(12) United States Patent  
Matsunami et al.

(10) Patent No.: US 10,179,285 B2  
(45) Date of Patent: Jan. 15, 2019

(54) GAME PROGRAM AND GAME APPARATUS

(71) Applicant: KABUSHIKI KAISHA SEGA Games, Tokyo (JP)

(72) Inventors: Keiichi Matsunami, Tokyo (JP); Fuminori Sato, Tokyo (JP)

(73) Assignee: KABUSHIKI KAISHA SEGA Games, Tokyo (JP)

( * ) Notice: Subject to any disclaimer, the term of this patent is extended or adjusted under 35 U.S.C. 154(b) by 2 days.

(21) Appl. No.: 15/511,985

(22) PCT Filed: Sep. 9, 2015

(86) PCT No.: PCT/JP2015/075594  
§ 371 (c)(1),  
(2) Date: Mar. 17, 2017

(87) PCT Pub. No.: WO2016/043105  
PCT Pub. Date: Mar. 24, 2016

(65) Prior Publication Data  
US 2017/0296917 A1    Oct. 19, 2017

(30) Foreign Application Priority Data  
Sep. 17, 2014    (JP) ................................ 2014-189129

(51) Int. Cl.  
*A63F 13/50*    (2014.01)  
*A63F 13/44*    (2014.01)  
(Continued)

(52) U.S. Cl.  
CPC ............ *A63F 13/44* (2014.09); *A63F 13/214* (2014.09); *A63F 13/46* (2014.09); *A63F 13/52* (2014.09);  
(Continued)

(58) Field of Classification Search  
CPC ........ A63F 13/44; A63F 13/214; A63F 13/46; A63F 13/52; A63F 13/525; A63F 13/55;  
(Continued)

(56) References Cited

U.S. PATENT DOCUMENTS

| | | | |
|---|---|---|---|
| 8,123,602 B2 * | 2/2012 | Ito | A63F 13/10 463/7 |
| 8,128,468 B2 * | 3/2012 | Takahashi | A63F 13/06 463/3 |

(Continued)

FOREIGN PATENT DOCUMENTS

JP    2011-189012    9/2011

OTHER PUBLICATIONS

English-language International Search Report issued by the Japanese Patent Office in corresponding International Application No. PCT/JP2015/075594, dated Dec. 8, 2015 (4 pages).

*Primary Examiner* — Allen Chan  
(74) *Attorney, Agent, or Firm* — Finnegan, Henderson, Farabow, Garrett & Dunner, L.L.P.

(57) ABSTRACT

Scrolling of a game image is controlled appropriately while increasing the amusement of the game. A game program causes a computer to perform: a reproducing step for reproducing a part of a game image on a display screen, the part of the game image including a first path displayed therein with a first object arranged on the first path, the first object indicating to a player an operation content of the computer, the part of the game image also including a second object displayed therein, the second object moving along the first path as time passes and indicating to the player an operation timing of the operation content; a first changing step for changing a display scaling factor for the first path; a shifting step for shifting an area displayed on the display screen as time passes according to a second path; and a correcting step for correcting the first path or the second path so that the (Continued)

second object, which is moving along the first path with the changed display scaling factor, is displayed on the display screen.

9 Claims, 15 Drawing Sheets

(51) Int. Cl.
*A63F 13/814* (2014.01)
*A63F 13/52* (2014.01)
*A63F 13/67* (2014.01)
*A63F 13/46* (2014.01)
*A63F 13/55* (2014.01)
*A63F 13/92* (2014.01)
*A63F 13/79* (2014.01)
*A63F 13/525* (2014.01)
*A63F 13/214* (2014.01)

(52) U.S. Cl.
CPC ............ *A63F 13/525* (2014.09); *A63F 13/55* (2014.09); *A63F 13/67* (2014.09); *A63F 13/79* (2014.09); *A63F 13/814* (2014.09); *A63F 13/92* (2014.09)

(58) Field of Classification Search
CPC ........ A63F 13/67; A63F 13/79; A63F 13/814; A63F 13/92
USPC ........................................................ 463/31
See application file for complete search history.

(56) References Cited

U.S. PATENT DOCUMENTS

| 8,784,201 B2* | 7/2014 | Kobayashi | A63F 13/428 |
| | | | 463/31 |
| 2011/0306422 A1* | 12/2011 | Nishimoto | G06F 3/017 |
| | | | 463/36 |
| 2013/0005464 A1 | 1/2013 | Yamamoto | |

\* cited by examiner

GAME PROGRAM AND GAME APPARATUS

TECHNICAL FIELD

The present invention relates to a game program and a game apparatus.

BACKGROUND ART

With some conventionally known game programs, players enjoy operating game apparatuses in tune with the music and images reproduced on the game apparatuses.

For example, Patent Document 1 discloses a technique which involves: arranging first objects, each indicating to a player an operation content of a game apparatus; selecting one of a plurality of paths within a game image at predetermined time intervals; and moving, along the selected path, a second object (a judgment line) that indicates to the player an operation timing of the above operation content.

CITATION LIST

Patent Document

Patent Document 1: JP2011-189012 A

SUMMARY

Technical Problem

The technique disclosed in Patent Document 1, however, displays the selected path and objects on the display screen in the same way every time, and accordingly, the player's sense of speed or realistic feeling will decrease as the player repeatedly plays the game, and this may reduce the amusement of the game.

Meanwhile, another technique is known which scrolls a part of the game image (i.e., shifts the area displayed on the display screen) in a manner such that the center of the display screen moves along a path different from the path on which the first objects are arranged (hereinafter, such different path will also be referred to as a "scroll line"). In this case as well, however, such scrolling is controlled almost in the same way every time and the technique cannot solve the above-mentioned problem.

In order to enhance the amusement of the game, the inventors have reached an idea of controlling the scrolling of the game image and, at the same time, changing the display scaling factor for the above-described path so as to change the moving speed of the second object. In this case, if such changed display scaling factor is directly applied to the scroll line, the second object will be too close to or too far from the center of the display screen, or, in the worst case, the second object may fall outside of the display screen.

In view of the above, an object of the invention is to provide a game program and game apparatus capable of controlling the scrolling of a game image appropriately while increasing the amusement of the game.

Solution to Problem

A game program according to the invention causes a computer to perform: a reproducing step for reproducing a part of a game image on a display screen, the part of the game image including a first path displayed therein with a first object arranged on the first path, the first object indicating to a player an operation content of the computer, the part of the game image also including a second object displayed therein, the second object moving along the first path with a passage of time and indicating to the player an operation timing of the operation content; a first changing step for changing a display scaling factor for the first path; a shifting step for shifting an area displayed on the display screen with the passage of time according to a second path; and a correcting step for correcting the first path or the second path so that the second object, which is moving along the first path with the changed display scaling factor, is displayed on the display screen.

Advantageous Effects of Invention

The invention achieves appropriate control of the scrolling of the game image while increasing the amusement of the game.

DESCRIPTION OF EMBODIMENTS

Hereinafter, embodiments of the invention will be described with reference to the attached drawings. It should be noted, however, that the embodiments described below are just examples and the below description is not intended to exclude various modifications or applications of techniques not expressly stated below. The invention can be carried out with various modifications (e.g., by combining the examples) within the gist of the invention. It should also be noted that, in the below description regarding the drawings, the same or similar portions will be indicated by the same or similar reference signs. Each of the drawings is a schematic view, and the dimensions and ratios, etc., in each drawing do not necessarily agree with the actual dimensions and ratios, etc. Furthermore, some of the relationships and ratios in terms of size shown in each of the drawings may be different from one another.

Embodiments

The game apparatus according to the embodiments of the invention may be a variety of types of computer game machine, such as a video game machine, portable game machine, arcade game machine, and personal computer. In an embodiment of the invention described below, a portable game machine will be described as one example of the game apparatus. Meanwhile, the game program according to the embodiments of the invention is a program executed on, for example, the above-mentioned portable game machine, with which a player enjoys operating the portable game machine in tune with at least one of the sounds (e.g., musical sounds, voices, sound effects) and images (e.g., still images, moving images, videos) reproduced on the portable game machine. In an embodiment of the invention described below, a music game program which players enjoy operating their portable game machines with in tune with music and moving images will be described as one example of the game program (hereinafter, the game executed by such music game program will be referred to as a "music game").

External Configuration

Figure 1:
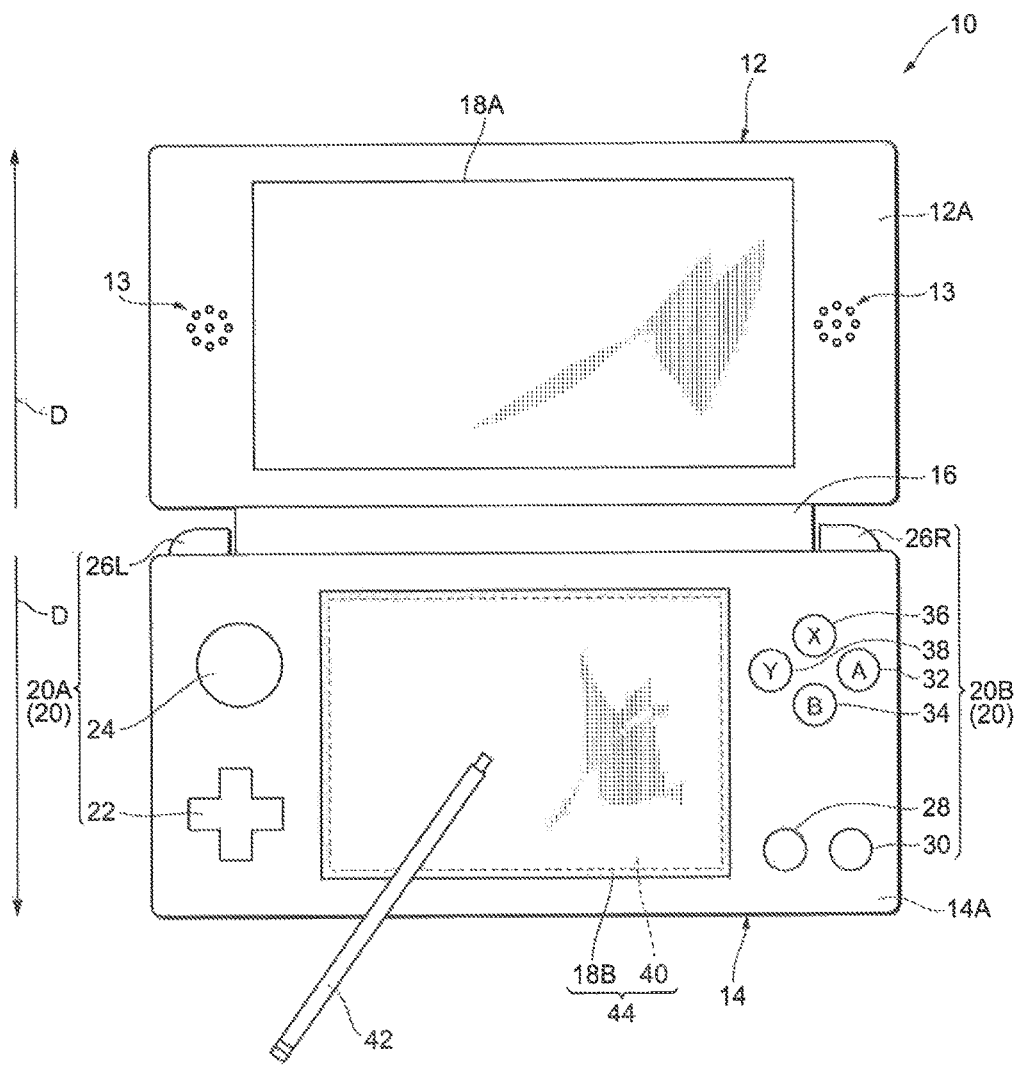
FIG. 1 is an illustration showing the external configuration of a portable game machine, which is an example of the game apparatus according to the embodiments.

First, the external configuration of the portable game machine will be described. FIG. 1 is an illustration showing the external configuration of a portable game machine 10, which is one example of the game apparatus according to the embodiments of the invention.

In FIG. 1, the portable game machine 10 has an upper body 12 and a lower body 14, each having a thin body in the shape of a rectangular parallelepiped, and the two bodies are connected so that the game machine 10 can be opened and closed when the two bodies pivot about a center hinge 16. Each of the opposed surfaces 12A and 14A of the upper body 12 and the lower body 14, i.e., the two visible surfaces in FIG. 1, has, in the center thereof, a rectangular display unit 18A, 18B with a predetermined size. For example, a liquid crystal panel display, a plasma display, and an EL (Electro Luminescence) display can be used for the display unit 18A, 18B.

Speakers 13 are disposed on the right and left sides of the display unit 18A of the upper body 12, and music, etc., of the music game of the present embodiment is played through the speakers 13.

An operation unit 20 is disposed on the lower body 14, and the operation unit 20 serves as a controller operated by the player upon use of the portable game machine 10. The operation unit 20 includes a left-hand operation unit 20A and a right-hand operation unit 20B respectively disposed on the left side and the right side of the display unit 18 in the lower body 14.

The left-hand operation unit 20A is operated by the player with their left hand upon use of the portable game machine 10. The left-hand operation unit 20A may include, for example, a cross-shaped button 22, an analogue pad 24, and an L-button 26L. The right-hand operation unit 20B is operated by the player with their right hand upon use of the portable game machine 10. The right-hand operation unit 20B may include, for example, a start button 28, a select button 30, an A-button 32, a B-button 34, an X-button 36, a Y-button 38, and an R-button 26R.

The cross-shaped button 22 is disposed in the opposed surface 14A, for example, at the left portion of the front side in the opening/closing direction D. As is already well known, the cross-shaped button 22 has four pressing parts and four sensing parts to sense a pressing operation at the upper, lower, left and right portions of the button. The cross-shaped button 22 is operated by the player, for example, by selecting and pressing any of the pressing parts according to the music and game image in the music game.

The analogue pad 24 is disposed in the opposed surface 14A, for example, at the left portion of the back side (the hinge 16 side) in the opening/closing direction D relative to the cross-shaped button 22. As is already well known, the analogue pad 24 is a joystick having a control stick which is provided upright so as to be able to be tilted and a detection part for detecting the direction and angle of tilting of the control stick, and such analogue pad 24 is used, for example, to change the location of the view point in the menu screen of the music game.

The L-button 26L and R-button 26R are disposed in the lower body 14, for example, at the left and right corners on a back-side surface in the opening/closing direction D. The L-button 26L and R-button 26R are configured, for example, to be pressed by the player so as to display a screen for setting the music game and a screen for setting characters appearing in the music game.

The start button 28 is disposed in the opposed surface 14A, for example, at the right portion of the front side in the opening/closing direction D. The start button 28 is used, for example, to provide an instruction to start the music game.

The select button 30 is disposed in the opposed surface 14A, for example, on the right of the start button 28. The select button 30 is used, for example, to select certain music in the music game and to provide instructions to respond to other various requests for selection.

The A-button 32 and Y-button 38 are disposed in the opposed surface 14A, for example, along the long-side direction of the lower body 14. The B-button 34 and X-button 36 are disposed in the opposed surface 14A, for example, along the short-side direction of the lower body 14. The A-button 32, B-button 34, X-button 36 and Y-button 38 are used by the player, for example, by selecting and pressing any of these buttons according to the music and game image in the music game.

A touch panel 40 of a known type is layered on the upper surface of the display unit 18B. A known touch panel may be used for the touch panel 40, and such touch panel 40 is formed with a thin transparent material that senses the location of a pressing operation (including a touch operation). For the sensing of a pressing operation, a method using a pressure-sensitive electrode device may be used. As another approach, a method of detecting a voltage drop, an optical method, and a method using capacitance coupling, etc., may be used as appropriate.

As is already well known, the touch panel 40 is configured to detect the position of a pressing operation to its upper surface by the player's finger or with a stylus pen 42, for example, as a sensing signal, such as a voltage in the direction perpendicular to the panel, and to thereby detect the two-dimensional coordinates of the pressing position. By associating the display coordinates of each image displayed on the display unit 18B with a perpendicular sensing signal (position coordinates) on the touch panel 40 in advance, it is possible to detect which of the images on the screen of the display unit 18B have been pressed. Further, when a pressing operation to the touch panel 40 is detected in a repeated and periodic manner at high speed, a continued state of pressing can be determined. For example, a state in which a pressing operation is detected continuously, a point in time when such state has ended (when such detection of a pressing operation has stopped), and a state in which the detected pressing position is varying (i.e., the detected position is moving) can each be recognized.

In cases where a pressing operation is performed with a finger, etc., the pressing position will be detected as a position within a certain range. In such case, the center position may be calculated (in other words, the center of gravity may be calculated) so as to take the calculated point as the pressing position. In the below description, a configuration including the display unit 18B and the touch panel 40, which is a form for detecting a pressing position and a pressing state, will be referred to as a touch screen 44.

Other than those described above, the portable game machine 10 is also provided with a power button, a home button for returning to the home screen of the portable game machine 10, and other buttons, which are not illustrated in the drawings.

Hardware Configuration

Figure 2:
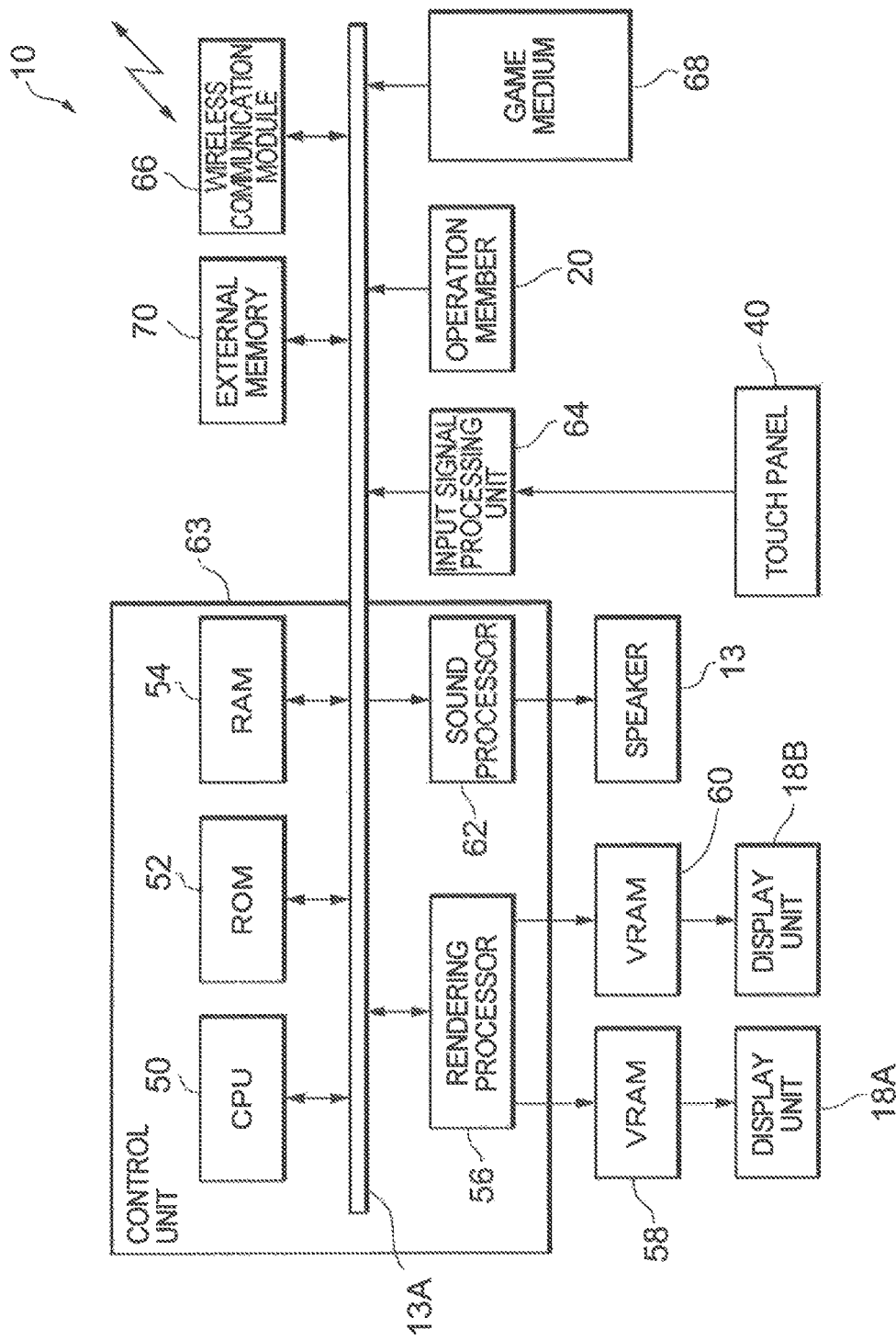
FIG. 2 is a block diagram illustrating an embodiment of the hardware configuration of the portable game machine shown in FIG. 1.

The hardware configuration of the portable game machine 10 will be described next. FIG. 2 is a block diagram illustrating an embodiment of the hardware configuration of the portable game machine 10 shown in FIG. 1.

The portable game machine 10 is equipped with a computer, and has a CPU (Central Processing Unit) 50. The CPU 50 is connected to a ROM (Read Only Memory) 52 and a RAM (Random Access Memory) 54 via a bus BA.

The portable game machine 10 also includes: a rendering processor 56 for displaying necessary images on each display unit 18A, 18B; VRAMs (Video RAMs) 58 and 60 associated with the display units 18A and 18B, respectively; and a sound processor 62 for generating acoustic signals, such as music sounds, game sound effects, and speeches, and outputting the generated acoustic signals to the speakers 13 (or an earphone terminal provided on a side (not shown)). The CPU 50, ROM 52, RAM 54, rendering processor 56 and sound processor 62 constitute a control unit 63.

The portable game machine 10 also includes an input signal processing unit 64 for continuously receiving detection signals from the touch screen 44 (constituted by the display unit 18B and touch panel 40) so as to detect a pressing operation and relevant coordinate information, and furthermore, the portable game machine 10 is configured, as required, to be connectable to a wireless communication module 66 and a game medium 68. The wireless communication module 66 enables data communication with other server apparatuses on the internet through wireless communication based on HSPA (High Speed Packet Access) or other communication standards.

The portable game machine 10 downloads, for example, the game program according to the present embodiment from a server apparatus (not shown in the drawings) on the internet, which stores game programs including game data thereon, via the wireless communication module 66. Alternatively, the portable game machine 10 may be configured to download, for example, the game program according to the present embodiment from the game medium 68, which stores game programs including game data thereon. The wireless communication module 66 provides data communication with other game apparatuses, which are not shown in the drawings, through (or not through) the internet, so that the player can play a match-up game, etc., with other players.

The ROM 52 stores a program for loading game programs and various data to the RAM 54 through the wireless communication module 66 or from the game medium 68, etc. An external memory 70 is a device for storing, as save information, game history information when the player saves (stores) the game in midstream, and such external memory 70 may be, for example, a small-size memory card or a USB (Universal Serial Bus) memory. In such case, the portable game machine 10 just needs to have a connection terminal that enables communication with the external memory 70 at a suitable position in the body of the portable game machine 10.

The RAM 54 has a load area for storing a loaded game program and a work area to be used when the CPU 50 executes the game program.

The CPU 50 controls the progress of the game by executing the game program loaded on the RAM 54 in response to a pressing operation on the touch screen 44 and operation contents performed on the operation unit 20. More specifically, when an operation signal, which has been detected on the touch screen 44 through an operation with a stylus pen 42, is input via the input signal processing unit 64, or when an operation signal is input through the operation unit 20, the CPU 50 performs, in response to the input operation signal, predetermined processing for the progress of the game in accordance with the game expanded on the RAM 54, and displays the result of the processing on the screen of the display unit 18A as an image showing the progress of the game (such image will hereinafter be referred to as the "game image") and also outputs certain music to the speakers 13 or an earphone terminal.

Software Configuration

Figure 3:
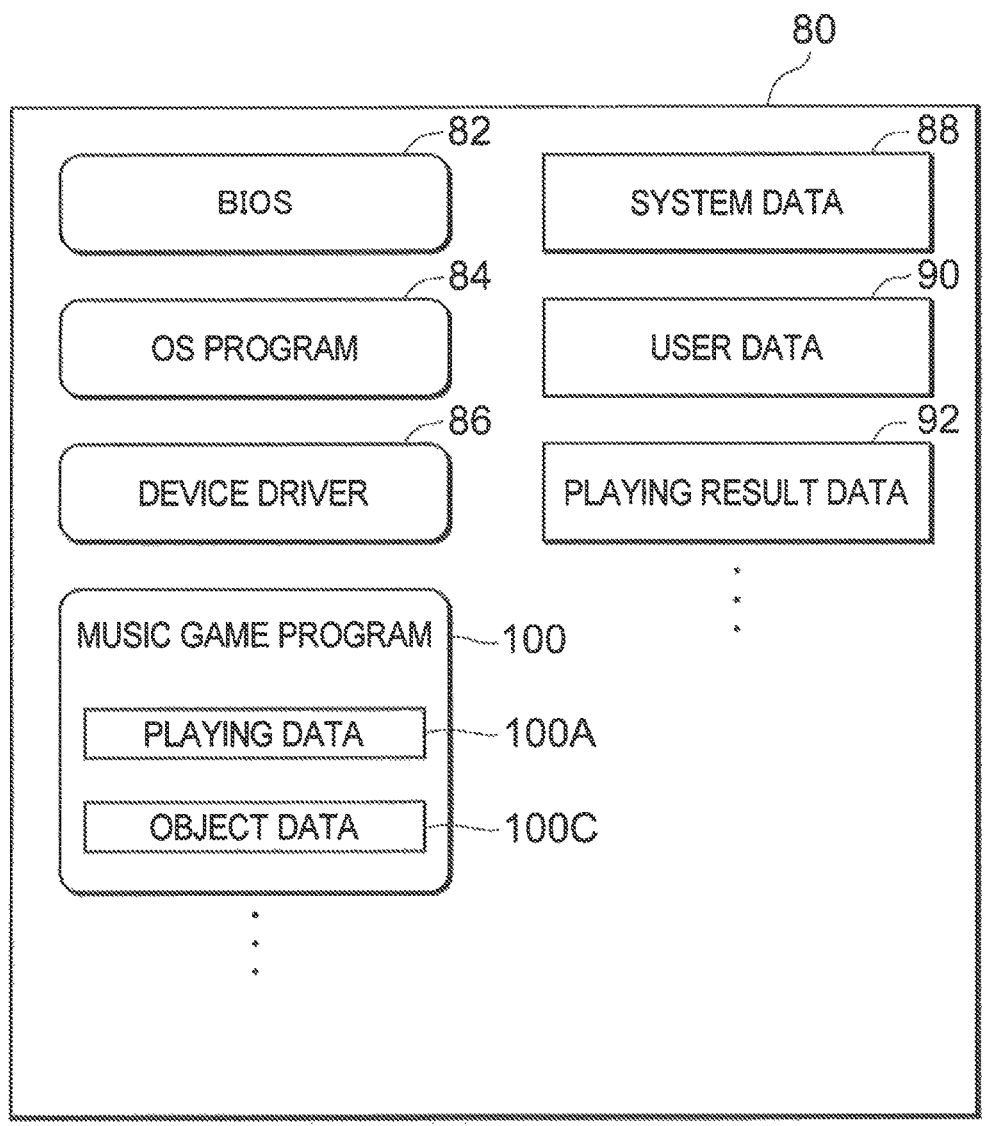
FIG. 3 is a diagram showing an example of the content of a memory group, such as a ROM and a RAM, in the portable game machine (such content including the content loaded on the memory group).

The software configuration of the portable game machine 10 will be described next. FIG. 3 is a diagram showing one example of the content of a memory group 80, such as the ROM 52 and RAM 54, in the portable game machine 10 (such content including the content loaded on the memory group).

The memory group 80 stores therein, for example, BIOS 82, an OS program 84, a device driver 86, system data 88 necessary for the control of the portable game machine 10, user data 90, playing result data 92, and a music game program 100 according to the present embodiment.

The BIOS 82, OS program 84, device driver 86 and system data 88 are known programs or data for use in the control of the portable game machine 10.

The user data 90 describes, for example, the name of the user of the portable game machine 10.

Of the above-mentioned content of the memory group 80, the playing result data 92 describes playing results, including, for example, the total scores obtained as a result of playing the music game and a specific rank determined based on the total scores.

The music game program 100 includes, for example, play data 100A and various object data 100C.

The play data 100A is multimedia data including image data and sound data. The play data 100A also includes time management data (not shown in the drawing) for managing the time of reproduction of the play data 100A. The time management data is associated with data indicating a timing at which a particular button should be operated by the player. The time management data is data defining an operation button to be operated by the player and a specific timing for such operation of the button. The time management data also describes the start time of each bar of music when music is reproduced during the playing of the music game.

Figure 7:
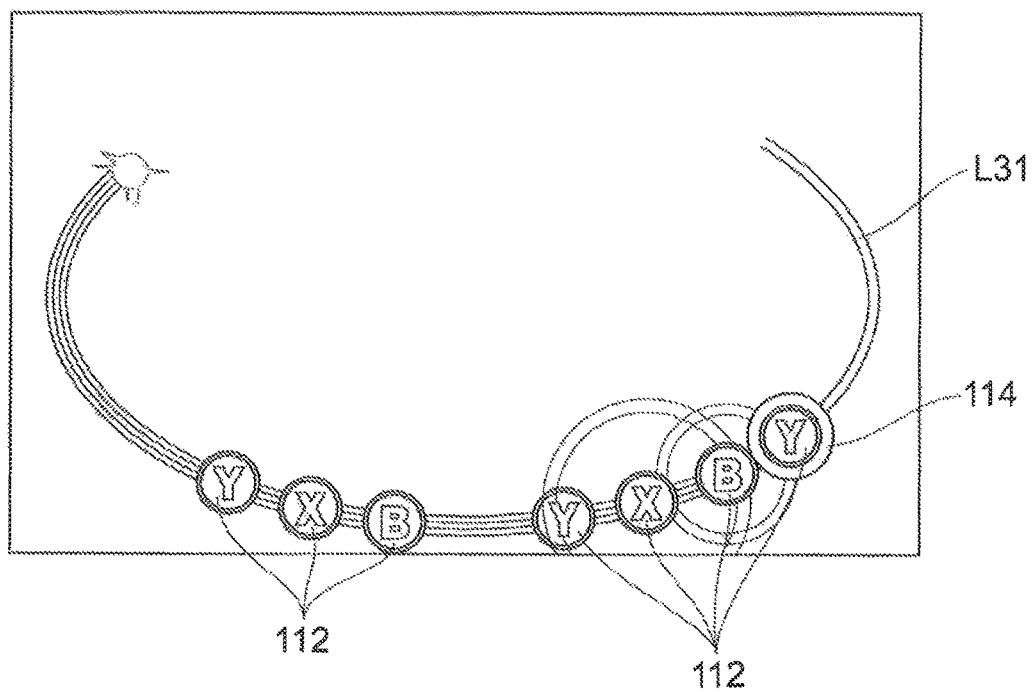
FIG. 7 is a diagram showing a part of the game image when "Circle Speed" is set to "Normal."

The various object data 100C includes, for example, data for rendering characters to be displayed on the game image based on the image data. Furthermore, as shown in FIG. 7, which will be described later, the various object data 1000 also includes data for rendering operation button marks 112, each of which serves as a first object that indicates to the player an operation content of the operation unit 20.

The various object data 1000 further includes data for rendering an operation timing mark 114, which serves as a second object that indicates to the player an operation timing of the operation content of the operation unit 20.

The various object data 1000 still further includes data for rendering a first path L31, which is a path on which the operation timing mark 114 moves and which is set within the game image. The various object data 100C may also include data for a second path along which a reference point of the display screen moves during the scrolling of the game image.

The first path L31 normally has a constant thickness (when the player is requested to simply press the operation unit 20 that is indicated by the operation button mark 112). Meanwhile, if the player is requested to hold down, or repeatedly strike, the operation unit 20 that is indicated by the operation button mark 112, a portion of the path on which the particular operation button mark 112 is positioned may be made thicker than the other portions of the path.

For the operation button mark 112, for example, as will be explained later, data for rendering a letter mark, such as a mark indicating the A-button 32, etc., in the operation unit 20, and data for rendering a direction mark indicating, with an arrow, any of the upper, lower, left and right directions of the cross-shaped button 22 in the operation unit 20 are described.

The shape of the operation button mark 112 is not particularly limited and it may be, for example, a circular, oval, rectangular, or triangular mark. A circular mark is employed in the present embodiment. The shape of the operation timing mark 114 is not particularly limited and it may be, for example, a circular, oval, elliptical, rectangular, triangular, or linear mark, or a mark having the shape of a character. A circular mark and an oval mark are employed in the present embodiment.

The circular operation timing mark 114 is sized so that, when displayed, the circular operation timing mark 114 encloses the operation button mark 112. Meanwhile, the oval operation timing mark 114 is sized so that, when displayed, the oval operation timing mark 114 encloses two or more operation button marks 112 arranged on the first path L31, each of these operation button marks 112 being associated with an operation content of the operation unit 20 to be operated at the same timing (see, for example, FIG. 7).

Game Overview

Next, an overview will be provided of a music game which will be implemented by the portable game machine 10 of the present embodiment when it executes the music game program 100.

The music game according to the present embodiment is configured so that the player operates a predetermined button of the portable game machine 10 at a predetermined timing while viewing, for example, a character of the game dancing, so that the player's operation is in tune with the game image provided on the portable game machine 10, as well as the music and video synchronized with the game image, and, with such operation, the player enjoys playing music together with the rendering effects of the music.

The button to be operated by the player and the timing of such operation are indicated, for example, by way of a first object representing an operation button mark and a second object representing an operation timing mark in the game image. More specifically, in the game image, the operation button marks are sequentially arranged on the first path at intervals corresponding to the timing at which each operation button mark should be operated to the rhythm of the music, and the operation timing mark moves so as to pass though these operation button marks one by one. The timing at which the passing circular or oval operation timing mark is enclosing a particular operation button mark (or marks) means the timing at which the player should operate the particular operation button(s).

Here, a part of the game image is displayed on the display screen while being scrolled. As used herein, the term "scrolling" means shifting the area displayed on the display screen. Such scrolling can create a sense of speed and realistic feeling; however, if the scrolling generates the same display content each time, the scrolling will become routine and the amusement of the game will be reduced.

According to the music game of the present embodiment, the display scaling factor for the first path is changed so that the speed that the player feels as the moving speed of the operation timing mark can be changed. In this configuration, if the game image is controlled so that a part of the game image is scrolled, such scrolling should be controlled appropriately according to the change of the display scaling factor. Such control of the scrolling will be described later.

A single play of the game is configured to continue during the time of one tune. During one tune, the player will get certain scores each time the player can operate an indicated button at an indicated timing. At the end of the one tune, the player's game rank will be determined as, for example, "S," "A," "B," or "C," according to the total scores that the player has obtained during the one tune.

In this way, players can compete against each other with regard to their playing results (playing content), such as their total scores and their game ranks. The playing results may be stored, for example, in the memory group 80 as playing result data 92. Hereinafter, the functions for implementing the above-mentioned music game will be described.

Functional Configuration

Figure 4:
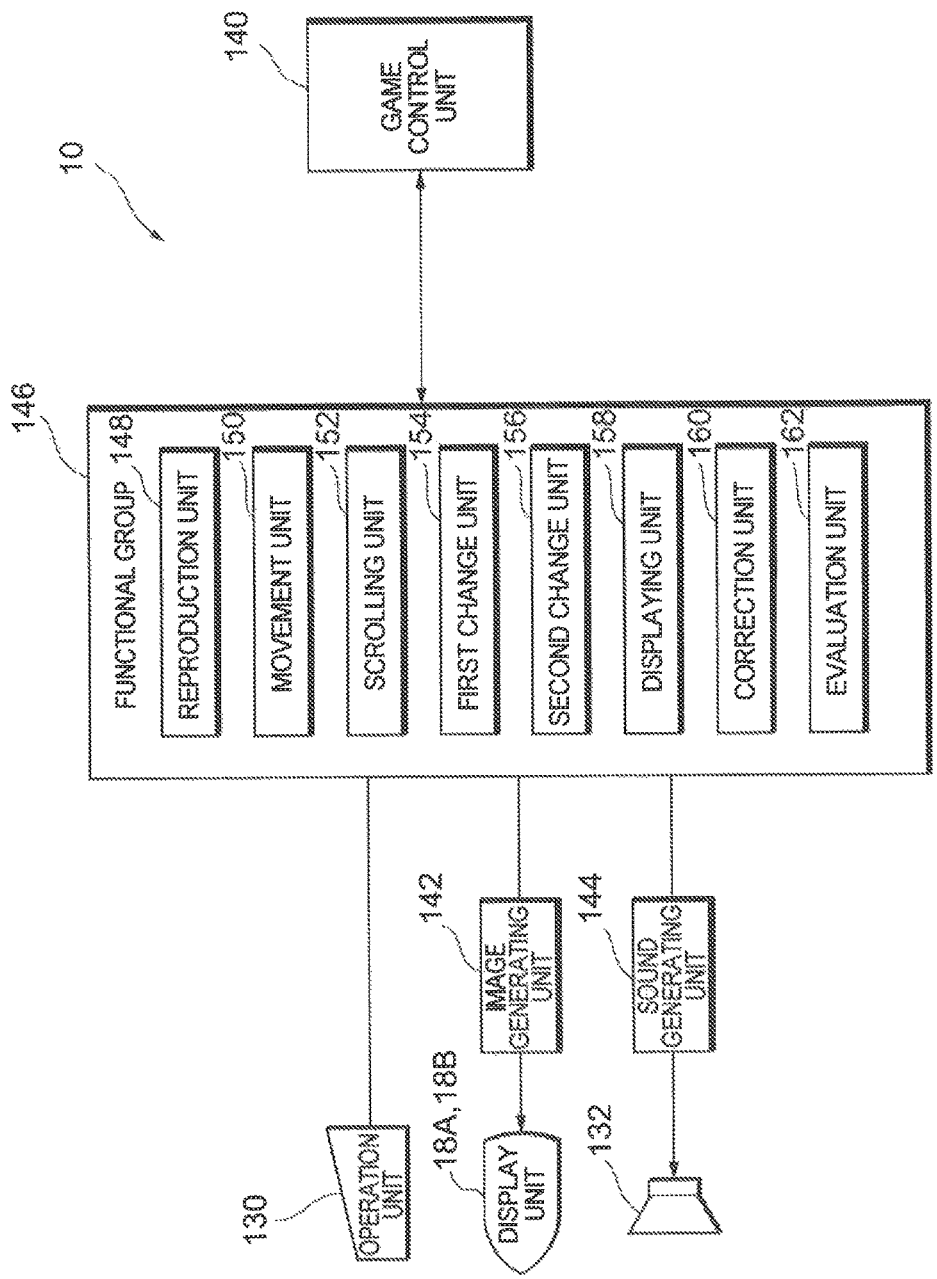
FIG. 4 is a block diagram showing an example of the functional configuration of the portable game machine according to the embodiments.

Next, the functional configuration of a portable game machine 10 according to a first embodiment of the invention will be described. FIG. 4 is a block diagram showing one example of the functional configuration of the portable game machine 10 according to the first embodiment of the invention. More specifically, FIG. 4 illustrates the configuration of various functional units, each of which is implemented on the portable game machine 10 when the CPU 50 executes the music game program 100 by working together with other hardware and software.

As illustrated in FIG. 4, the portable game machine 10 has a display unit 18A, 18B, an operation unit 20, and a speaker 13, all of which serve as a functional means forming a user interface. The portable game machine 10 also has a game control unit 140, an image generating unit 142, a sound generating unit 144, and a functional group 146 including various functional units related to the music game implemented by the game program according to the present embodiment.

The speaker 13 generates, under the control of the game control unit 140 and the functional group 146, sounds based on signals output from the sound generating unit 144. The display unit 18A, 18B displays, under the control of the game control unit 140 and the functional group 146, a part of the game image on the display screen based on signals output from the image generating unit 142. The operation unit 20 outputs an operation signal depending on the button that has been operated by the player to provide an instruction to the portable game machine 10.

The game control unit 140 performs overall control of the progress of the music game, which is implemented by the music game program 100.

The image generating unit 142 generates various images, including a part of the game image, based on image data output from the functional group 146, and outputs the generated images to the display unit 18A, 18B.

The sound generating unit 144 generates game sounds based on sound data output from the functional group 146, and outputs the generated sounds to the speaker 13.

The functional group 146 includes a reproduction unit 148, a movement unit 150, a scrolling unit 152, a first change unit 154, a second change unit 156, a displaying unit 158, a correction unit 160, and an evaluation unit 162. The outline of each functional unit will be described below.

The reproduction unit 148, under the control of the game control unit 140, sequentially reads play data which has been selected by the player from among the play data 100A stored on the memory group 80, and outputs image data to the display unit 18A, 18B via the image generating unit 142. The reproduction unit 148 also outputs sound data to the speaker 13 via the sound generating unit 144. As a result, the reproduction unit 148 reproduces the music, the game image, etc.

It is to be noted here that a displayed part of the game image on the display unit 18A, 18B includes: a first path (judgment line) on which operation button marks (first objects), each indicating an operation content of the computer to the player, are arranged; and an operation timing mark (second object) that moves along the first path with the passage of time (e.g., with the reproduction of sounds) and indicates to the player an operation timing of the operation content.

The movement unit 150 performs, under the control of the game control unit 140, a moving mode while a predetermined number of bars of the music are being reproduced by the reproduction unit 148 after the start of the music game. This moving mode means a mode of setting a first path in the game image with one or more operation button marks arranged on the first path, and displaying an operation timing mark in the game image and moving the timing mark along the first path with the passage of time (e.g., with the reproduction of the music).

The scrolling unit 152 scrolls, under the control of the game control unit 140, a part of the game image (i.e., shifts the area displayed on the display screen) with the passage of time (e.g., with the reproduction of the music). The image data after the scrolling is output to the image generating unit 142, so that the game image after the scrolling is reproduced.

The scrolling unit 152 scrolls a part of the game image, for example, in such a manner that the center of the display screen is regarded as a point of gazing and this point of gazing moves along the second path (scroll line) in the game image. Regarding the center of the display screen as a point of gazing will be effective if it is intended to display a character at the center position of the display screen. The position of the point of gazing, however, is not limited to the above.

When the display scaling factor for the first path is changed, the scrolling unit 152 controls the scrolling so that the second object, which is moving along the first path with such changed display scaling factor, is displayed on the display screen. For example, the scrolling unit 152 scrolls a part of the game image in such a manner that the positional relationship between the position of the second path and the position of the first path in the display screen does not change before and after the change of the display scaling factor.

One reason for controlling the scrolling as described above is that applying the changed display scaling factor for the first path directly to the second line will lead to a change of the positional relationship (e.g., the space) between the first and second paths in the display screen so that the first path may fall outside of the display screen. This will be described later with reference to FIG. 5.

In the present embodiment, scrolling is controlled so that the second object, which is moving along the first path after the change of the display scaling factor, is displayed on the display screen, and accordingly, the present embodiment can prevent scrolling control which may lead to a failure of the game due to the second object not being visible on the display screen. Furthermore, in the present embodiment, a part of the game image is scrolled so that the positional relationship between the second path and the first path in the display screen does not change before and after the change of the display scaling factor, and this enables the scrolling to be controlled in an appropriate manner without bringing an unnatural feeling to the player.

The first change unit 154 changes, under the control of the game control unit 140, the display scaling factor for the first path. Such change of the display scaling factor for the first path means, for example, increasing/decreasing the distance from a reference point of the game image to the first path. The reference point of the game image may be, for example, the center position of the game image. The first change unit 154 may allow the display scaling factor to be changed, for example, on a setting screen of the music game, or allow the display scaling factor to be changed automatically in the middle of the game according to the results of evaluation of the player's operation, which will be described later.

In the latter case, the first change unit 154 may increase the display scaling factor so as to accordingly increase the moving speed of the operation timing mark if the operation timing has been evaluated as being fast, at a frequency equal to or greater than a threshold within a predetermined time period, while decreasing the display scaling factor so as to accordingly decrease the moving speed of the operation timing mark if the operation timing has been evaluated as being slow, at a frequency equal to or greater than a threshold within a predetermined time period. Alternatively, the first change unit 154 may change the display scaling factor if a good evaluation result has been made a predetermined number of times in a row. With the above configuration, the moving speed of the operation timing mark can be changed automatically, depending on the player's operational tendencies.

The second change unit 156 changes, under the control of the game control unit 140, the display scaling factor for the first object in the display screen. The second change unit 156 may allow the display scaling factor for the first object to be changed, for example, on a setting screen of the music game, or allow the display scaling factor for the first object to be changed automatically according to the change of the display scaling factor to be applied to the distance to the first path. With this configuration, the setting can be changed so as to increase the operability for the player.

The displaying unit 158 displays, under the control of the game control unit 140, upon execution by the movement unit 150, the first path in the game image with one or more operation button marks arranged on the first path, via the image generating unit 142 and the display unit 18B.

The correction unit 160 corrects, under the control of the game control unit 140, the first path or the second path, so that the second object, which is moving along the first path with the changed display scaling factor, is displayed on the display screen. For example, the correction unit 160 corrects the second path to which the changed display scaling factor has been applied, so that the positional relationship between the first path and the second path does not change before and after the change of the display scaling factor. More specifically, the correction unit 160 corrects the second path after the application of the changed display scaling factor based on the positional relationship between a first point on the first path and a second point on the second path, both points being set for use in correction. Further, the correction unit 160 may be configured so as to: define a first vector based on the first point and the second point; calculate a second vector by multiplying the first vector by a certain factor according to the display scaling factor; and use the obtained second vector to correct the second path. This configuration enables easy correction of the scrolling. The correction unit 160 may be configured as a part of the function of the scrolling unit 152.

The evaluation unit 162 determines and evaluates, under the control of the game control unit 140, whether the player has operated the operation unit 20 correctly, in accordance with the read play data 100A, the detail of operation of the operation unit 20 by the player, and the timing of such operation.

More specifically, the evaluation unit 162 determines and evaluates whether the details of the player's operation of the operation unit 20 are correct and how far the timing of such operation has shifted from a specified time (i.e., a specific point in time associated with an instruction for such operation of rendering), based on the operation signal given by the operation unit 20 and by referring to the play data 100A, and refers to the results of the determination and evaluation to determine, for example, the scores in the game image.

The evaluation unit 162 may be configured so as to output a result of evaluation to the first change unit 154 each time when the player's operation has been evaluated, or to output several evaluation results at a time, while the game is in progress, in order to change the display scaling factor for the first path.

First Path (Judgment Line) and Second Path (Scroll Line)

Figure 5:
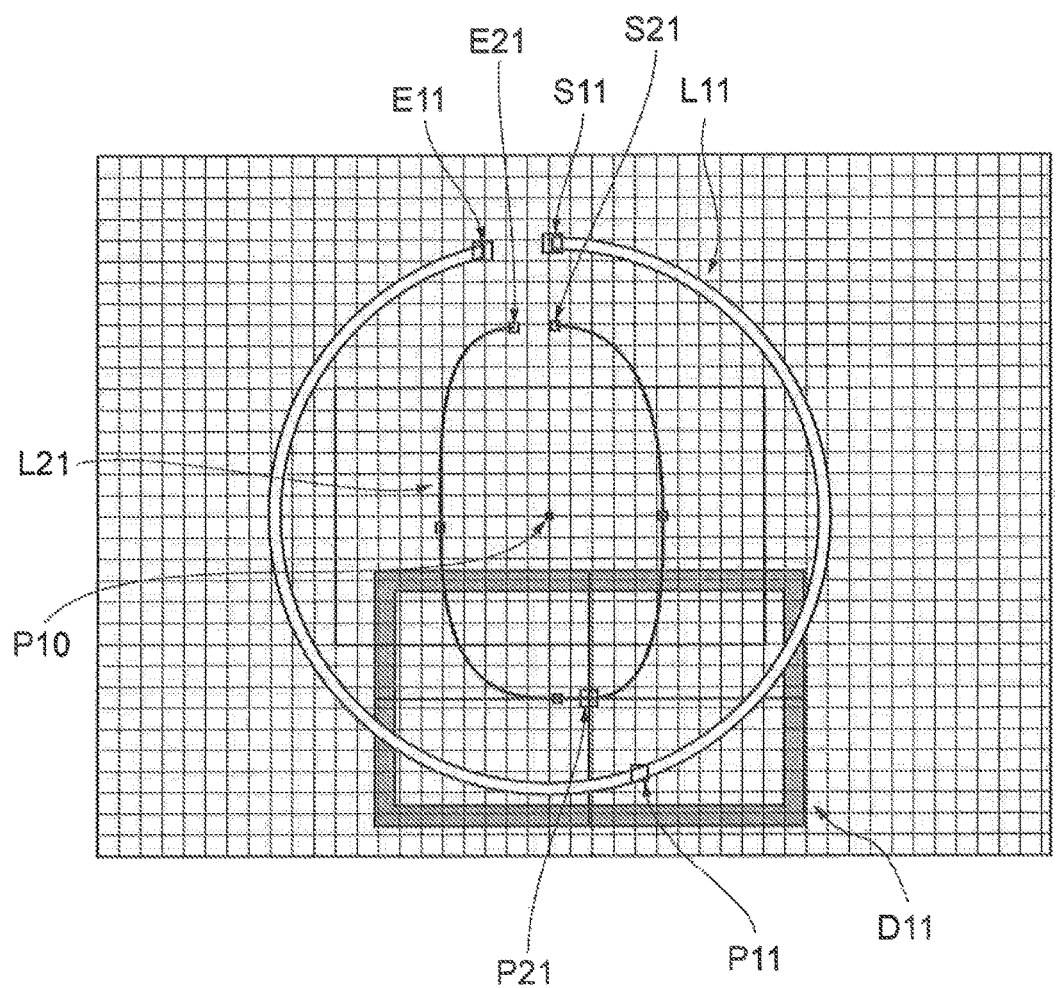
FIG. 5 is a diagram showing an example of the first path and the second path.

Next, the first path (judgment line) and the second path (scroll line) will be described more specifically. FIG. 5 is a diagram showing one example of the first path and the second path. The grid area in FIG. 5 as a whole represents the game image.

Line L11 in FIG. 5 represents the first path, while line L21 represents the second path. Points S11 and E11 respectively represent the start and end points of the first path, and points S21 and E21 respectively represent the start and end points of the second path.

Point P10 represents the center (reference point) of the game image, and frame D11 represents a part of the game image that is displayed on the display screen at a particular point in time. Point P21 represents the center (point of gazing) of the display screen and point P11 represents a given point on the first path. Point P21, which serves as a reference for scrolling a part of the game image, moves along the second path, L21.

In the example shown in FIG. 5, the first change unit 154 changes the display scaling factor applied to the distance from point P10 to the first path, L11. This display scaling factor is represented by L. If the display scaling factor L is directly applied to the second path, L21, the space between the first path and the second path is also scaled by L-times; i.e., when L is greater than 1, the space between the first path and the second path will be wider, and when L is smaller than 1, the space between the first path and the second path will be narrower. When L is a value considerably greater than 1, the space between the first path and the second path may be so wide that the first path will fall outside of the range of the display screen, D11.

In view of the above, the correction unit 160 does not directly apply the factor L to the second path, but instead, corrects the second path so that the positional relationship between the respective positions of the first path and the second path in the display screen does not change before and after the change of the display scaling factor L. With this configuration, appropriate control of the scrolling can be made.

To be more specific, when the display scaling factor L for the first path is changed by the first change unit 154, the change correction unit 160 performs correction processing as follows:

$$B' = L \times (B - C) \quad \text{Equation (1);}$$

$$A' = L \times (A - C) \quad \text{Equation (2);}$$

$$V = (B' - A') \quad \text{Equation (3);}$$

$$V' = V \times (L - 1.0) \quad \text{Equation (4); and}$$

$$A'' = A' + V' \quad \text{Equation (5),}$$

where B represents a vector from a reference point (e.g., a point of origin) of the game image to a given point (e.g., P11) on the first path which is set for correction, A represents a vector from the reference point of the game image to a given point (e.g., P21) on the second path which is set for correction, C represents a vector from the reference point (e.g., a point of origin) of the game image to the center of the game image, B' represents a vector from the center of the game image to a given point on the first path after the change, A' represents a vector from the center of the game image to a given point on the second path after the change, and A" represents a vector from the center of the game image to a given point on the corrected second path.

In Equation (5), the correction unit 160 may add a certain proportion of V' to A', instead of adding V' directly to A'.

Now, the reason why the above-described correction is needed will be described. The display screen D11 has a fixed size, and thus, if the display scaling factor L is greater than 1, the space between the center, P21, of the display screen D11 and point P11 after the change of the display scaling factor increases and point P11 may fall outside of the range of the display screen.

On the other hand, if the display scaling factor L is smaller than 1, the space between the center, P21, of the display screen D11 and point P11 after the change of the display scaling factor decreases and point P11 may be too close to the center of the display screen.

In order to solve the above problems, the position of point P21 after the change of the display scaling factor is corrected so that the respective positions of point P11 on the first path and point P21 on the second path, when viewed by the player, do not change in the display screen, regardless of the value of the display scaling factor L.

The coordinate data of the second path may be stored in advance, or may be calculated and determined based on the first path at each time of scrolling.

Specific Examples of Game Screen

Figure 6:
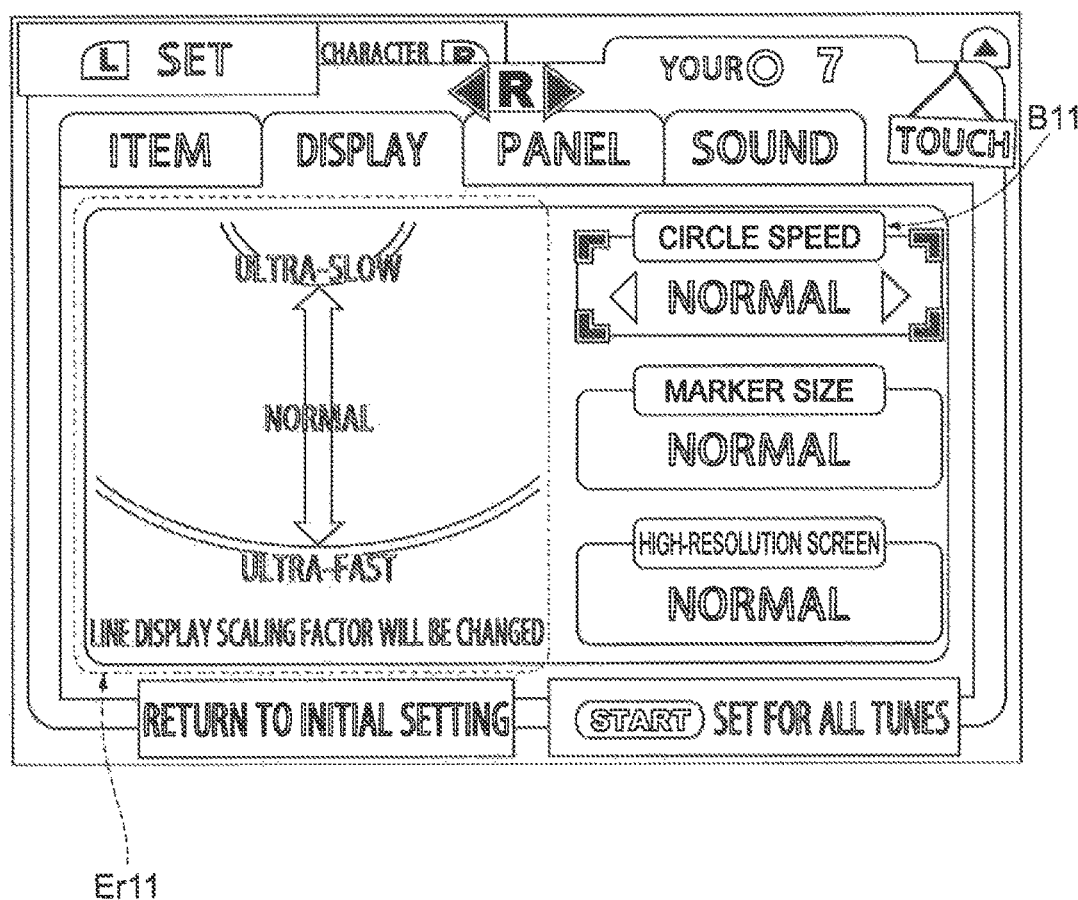
FIG. 6 is a diagram showing an example of a setting screen A in the embodiments.

Next, specific examples of the game screen according to the present embodiment will be described. FIG. 6 is an illustration showing one example of a setting screen A in the present embodiment. By pressing the portion with the left or right arrow on the "Circle Speed" button B11 shown in FIG. 6, the player can change the "Circle Speed" to "Ultra-slow," "Normal" or "Ultra-fast.

When the "Circle Speed" is set to "Ultra-slow," the first change unit 154 changes the display scaling factor to L1 (L1<1.0), and when the "Circle Speed" is set to "Ultra-fast," the first change unit 154 changes the display scaling factor to L2 (L2>1.0). The display scaling factor L is 1.0 in the default setting.

The area Er11 in FIG. 6 shows the judgment line (first path) as it will appear if its display scaling factor is changed. If the display scaling factor for the judgment line is increased, the judgment line will appear to be a line in a circular pattern with an increased radius, and accordingly, the speed of the operation timing mark moving along such judgment line will increase. On the other hand, if the display scaling factor for the judgment line is decreased, the judgment line will appear to be a line in a circular pattern with a reduced radius, and accordingly, the speed of the operation timing mark moving along such judgment line will decrease.

FIG. 7 is an illustration showing a part of the game image when the "Circle Speed" is set to "Normal." The part of the game image in the example shown in FIG. 7 includes a judgment line (first path) L31, operation button marks (first objects) 112, and an operation timing mark (second object) 144.

Figure 8:
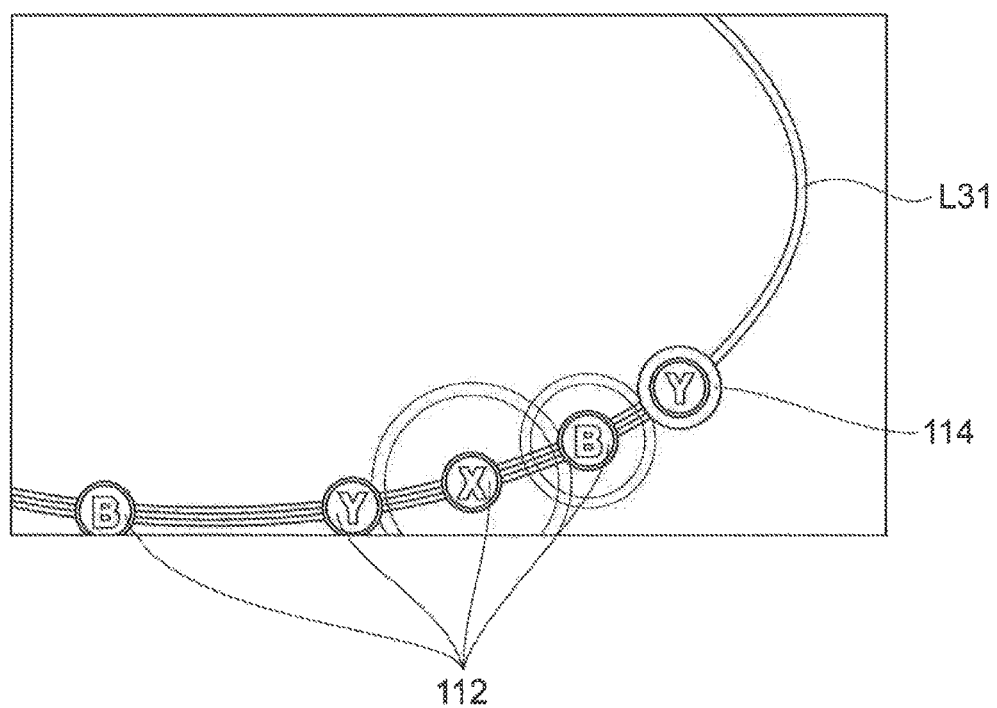
FIG. 8 is a diagram showing a part of the game image when "Circle Speed" is set to "Ultra-fast."

FIG. 8 is an illustration showing a part of the game image when the "Circle Speed" is set to "Ultra-fast." In the example shown in FIG. 8, the judgment line (first path) L41 is displayed at a scaling factor greater than the scaling factor for the judgment line L31 in FIG. 7. As a result, the operation button marks (first objects) 112 have a larger space therebetween, and this leads to an increase in the moving speed of the operation timing mark (second object) 114 because the pace of the music does not change.

Figure 9:
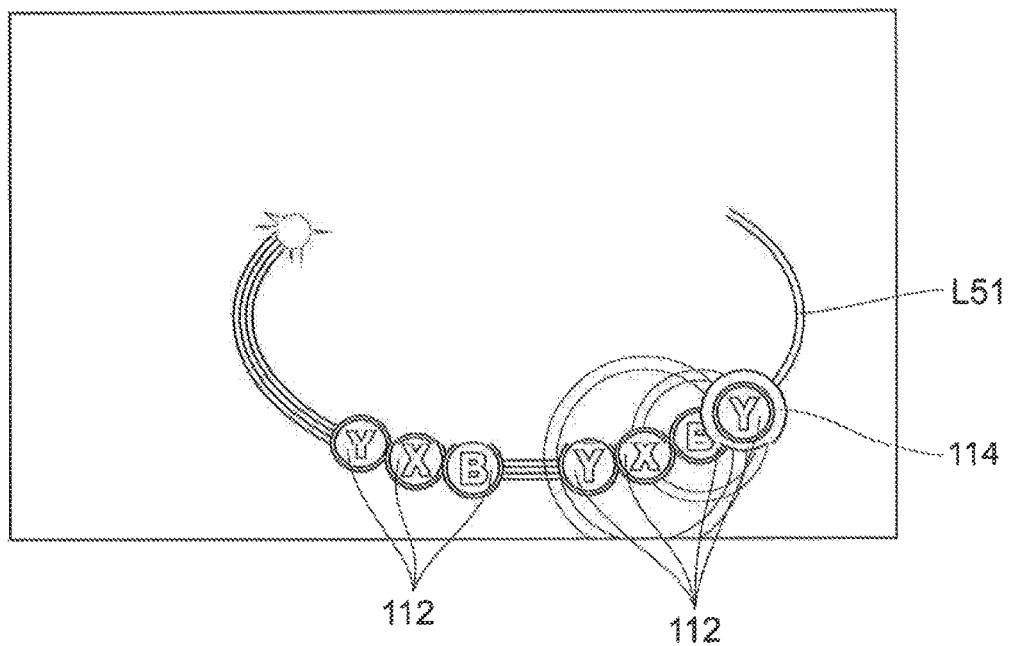
FIG. 9 is a diagram showing a part of the game image when "Circle Speed" is set to "Ultra-slow."

FIG. 9 is an illustration showing a part of the game image when the "Circle Speed" is set to "Ultra-slow." In the example shown in FIG. 9, the judgment line (first path) L51 is displayed at a scaling factor smaller than the scaling factor for the judgment line L31 in FIG. 7. As a result, the operation button marks (first objects) 112 have a smaller space therebetween, and this leads to a decrease in the moving speed of the operation timing mark (second object) 114 because the pace of the music does not change.

Figure 10:
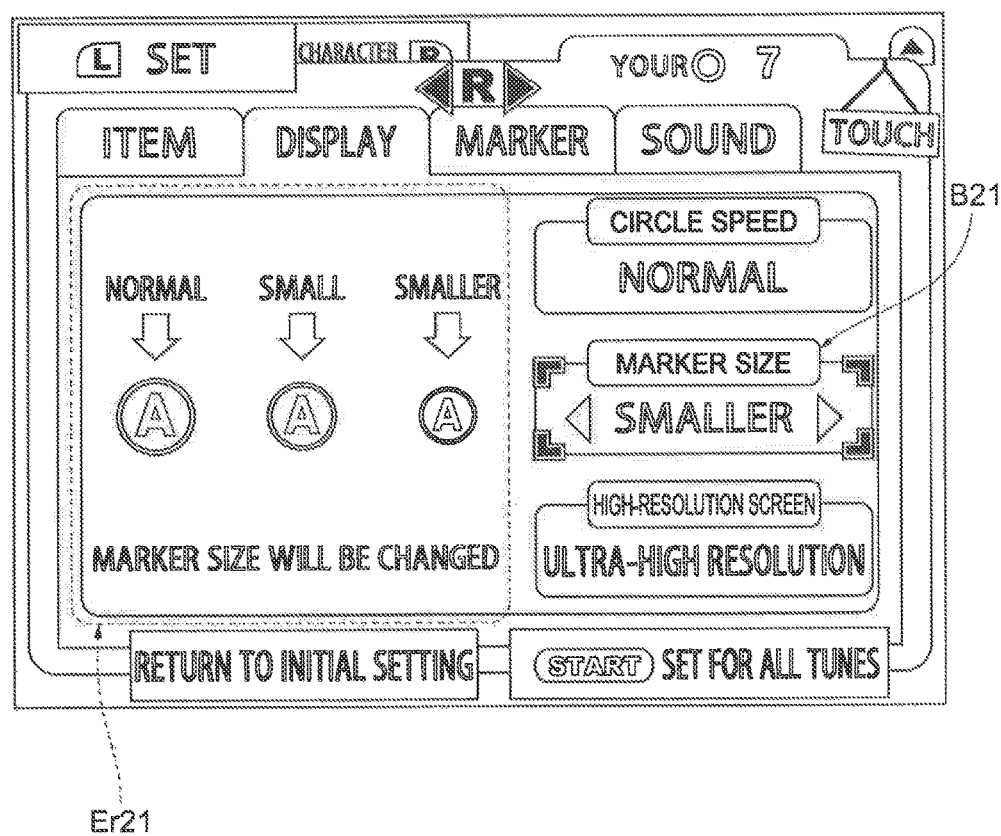
FIG. 10 is a diagram showing an example of a setting screen B in the embodiments.

FIG. 10 is an illustration showing one example of a setting screen B in the present embodiment. By pressing the portion with the left or right arrow on the "Marker Size" button B21 shown in FIG. 10, the player can change the "Marker Size" to "Normal," "Small" or "Smaller."

Here, the second change unit 156 considers that, for example, the size of the "Normal" operation button mark is a reference size, and changes the display scaling factor to L'1 (L'1<1.0) when the "Marker Size" is set to "Small," while changing the display scaling factor to L'2 (L'2<L'1) when the "Marker Size" is set to "Smaller." The display scaling factor L' is 1.0 in the default setting.

The area Er21 in FIG. 10 shows the operation button mark (first object) as it will appear if its display scaling factor is changed. With this setting, the player can set the size of the operation button mark so that the player can operate the operation button mark more easily.

Figure 11:
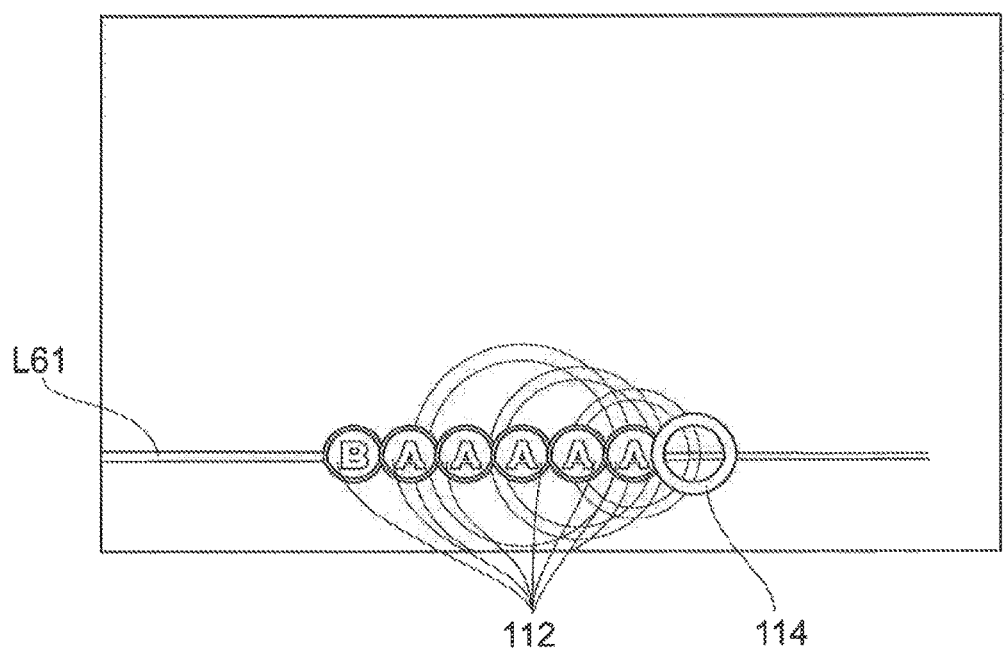
FIG. 11 is a diagram showing a part of the game image when "Marker Size" is set to "Normal."

FIG. 11 is an illustration showing a part of the game image when the "Marker Size" is set to "Normal." The part of the game image in the example shown in FIG. 11 includes a judgment line (first path) L61, operation button marks (first objects) 112, and an operation timing mark (second object) 144.

Figure 12:
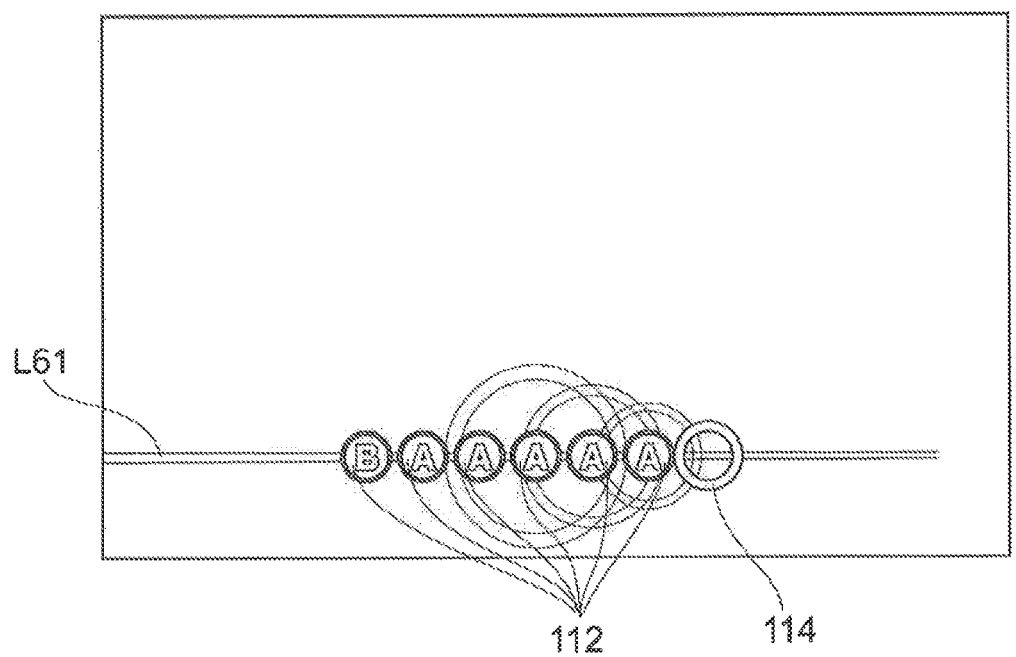
FIG. 12 is a diagram showing a part of the game image when "Marker Size" is set to "Small."

FIG. 12 is an illustration showing a part of the game image when the "Marker Size" is set to "Small." In the example shown in FIG. 12, the operation button marks 112 on the judgment line (first path) L61 are displayed at a scaling factor smaller than the scaling factor for the operation button marks 112 shown in FIG. 11.

Figure 13:
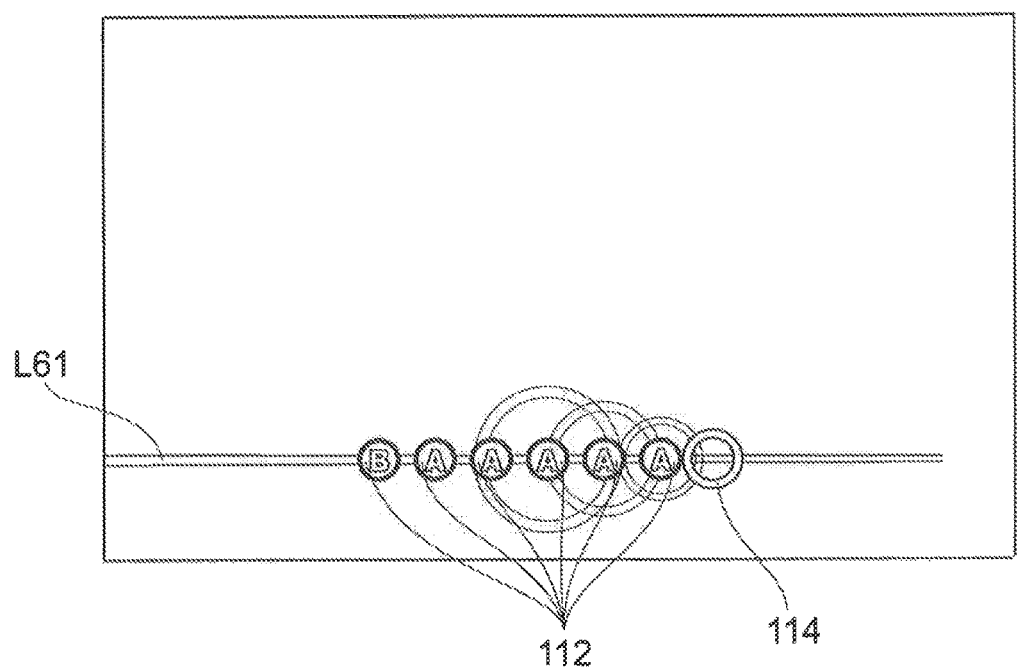
FIG. 13 is a diagram showing a part of the game image when "Marker Size" is set to "Smaller."

FIG. 13 is an illustration showing a part of the game image when the "Marker Size" is set to "Smaller." In the example shown in FIG. 13, the operation button marks 112 on the judgment line (first path) L61 are displayed at a scaling factor smaller than the scaling factor for the operation button marks 112 shown in FIG. 12.

Together with the change of the "Marker Size," the size of the operation timing mark 114 may also be changed in a similar manner. Alternatively, a plurality of modes may be set in advance and a particular "Circle Speed" and "Marker Size" may be determined for each mode.

Action

Figure 14:
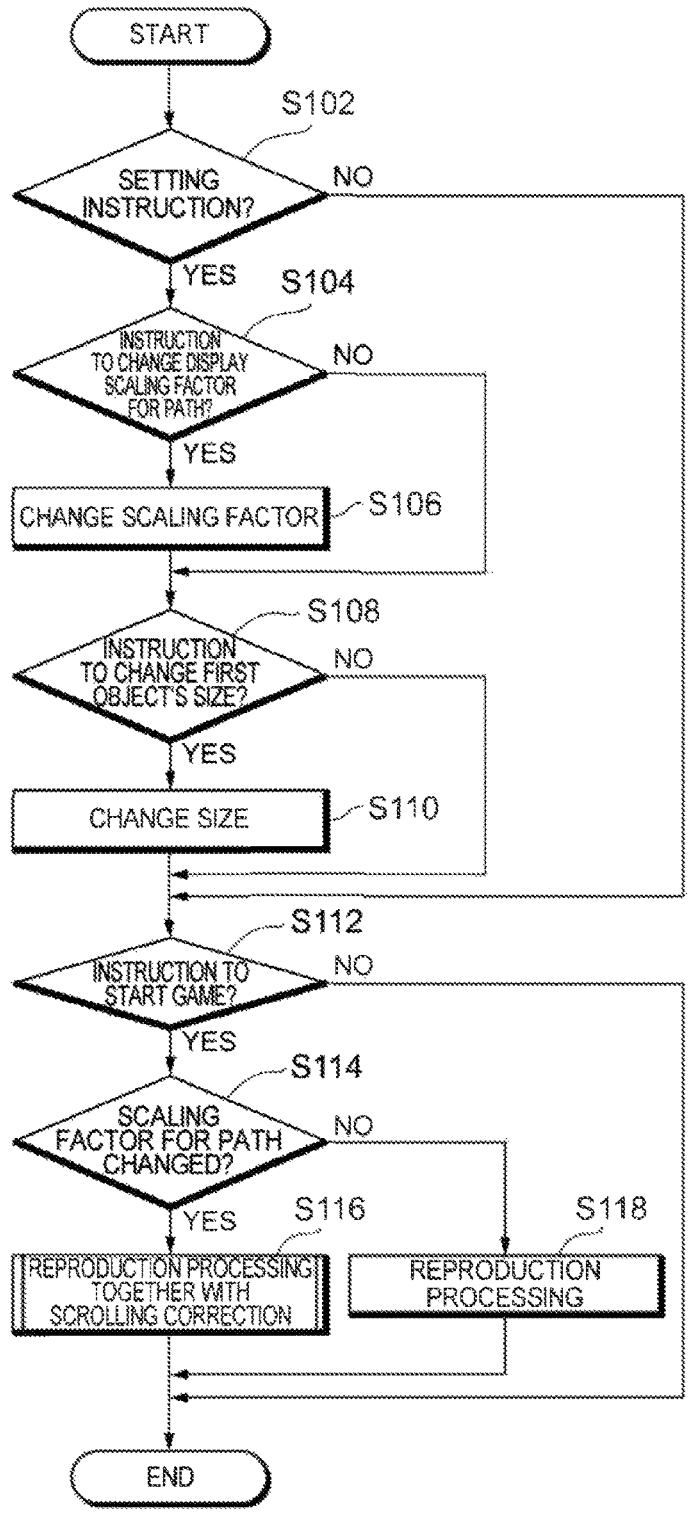
FIG. 14 is a flowchart showing an example of game processing according to the embodiments.

Next, the game processing performed by the portable game machine 10 according to the present embodiment will be described. FIG. 14 is a flowchart showing one example of the game processing according to the present embodiment.

In step S102 in FIG. 14, the game control unit 140 determines whether a setting instruction has been received from the player via the setting screen. If a setting instruction is received (step S102: YES), the processing goes to step S104, and if no setting instruction is received (step S102: NO), the processing goes to step S112. In the example shown in FIG. 14, the above setting instruction is either an instruction regarding the "Circle Speed" or an instruction regarding the "Marker Size" shown in FIG. 6, etc.

In step S104, the first changing means 154 determines whether an instruction to change the display scaling factor for the first path has been received. If the result of the determination is "yes" (step S104: YES), the processing goes to step S106, and if the result of the determination is "no" (step S104: NO), the processing goes to step S108.

In step S106, the first changing means 154 changes the display scaling factor for the first path as instructed. For example, if "Ultra-fast" is selected on the screen shown in FIG. 6, the first changing means 154 changes the display scaling factor to L1, and if "Ultra-slow" is selected, the first changing means 154 changes the display scaling factor to L2.

In step S108, the second changing means 156 determines whether an instruction to change the display scaling factor for the first object has been received. If the result of the determination is "yes" (step S108: YES), the processing goes to step S110, and if the result of the determination is "no" (step S108: NO), the processing goes to step S112.

In step S110, the second changing means 156 changes the display scaling factor for the first object (i.e., the size of the first object) as instructed. For example, if "Small" is selected on the screen shown in FIG. 10, the second changing means 156 changes the display scaling factor to L'1 and if "Smaller" is selected, the second changing means 156 changes the display scaling factor to L'2.

In step S112, the game control unit 140 determines whether an instruction to start the game has been received from the player. If the result of the determination is "yes" (step S112: YES), the processing goes to step S1114, and if the result of the determination is "no" (step S112: NO), the processing ends and returns to step S102.

In step S114, the game control unit 140 determines whether the display scaling factor for the first path has been changed. If the result of the determination is "yes" (step S114: YES), the processing goes to step S116, and if the result of the determination is "no" (step S114: NO), the processing goes to step S118.

In step S116, the reproduction unit 148 reproduces the music and game image, and the scrolling unit 152 controls the scrolling of the game image while correcting the second path. This processing will be described below with reference to FIG. 15.

In step S118, the reproduction unit 148 reproduces the music and game image, and the scrolling unit 152 controls the scrolling of the game image so that the center of the display screen moves along the second path.

Figure 15:
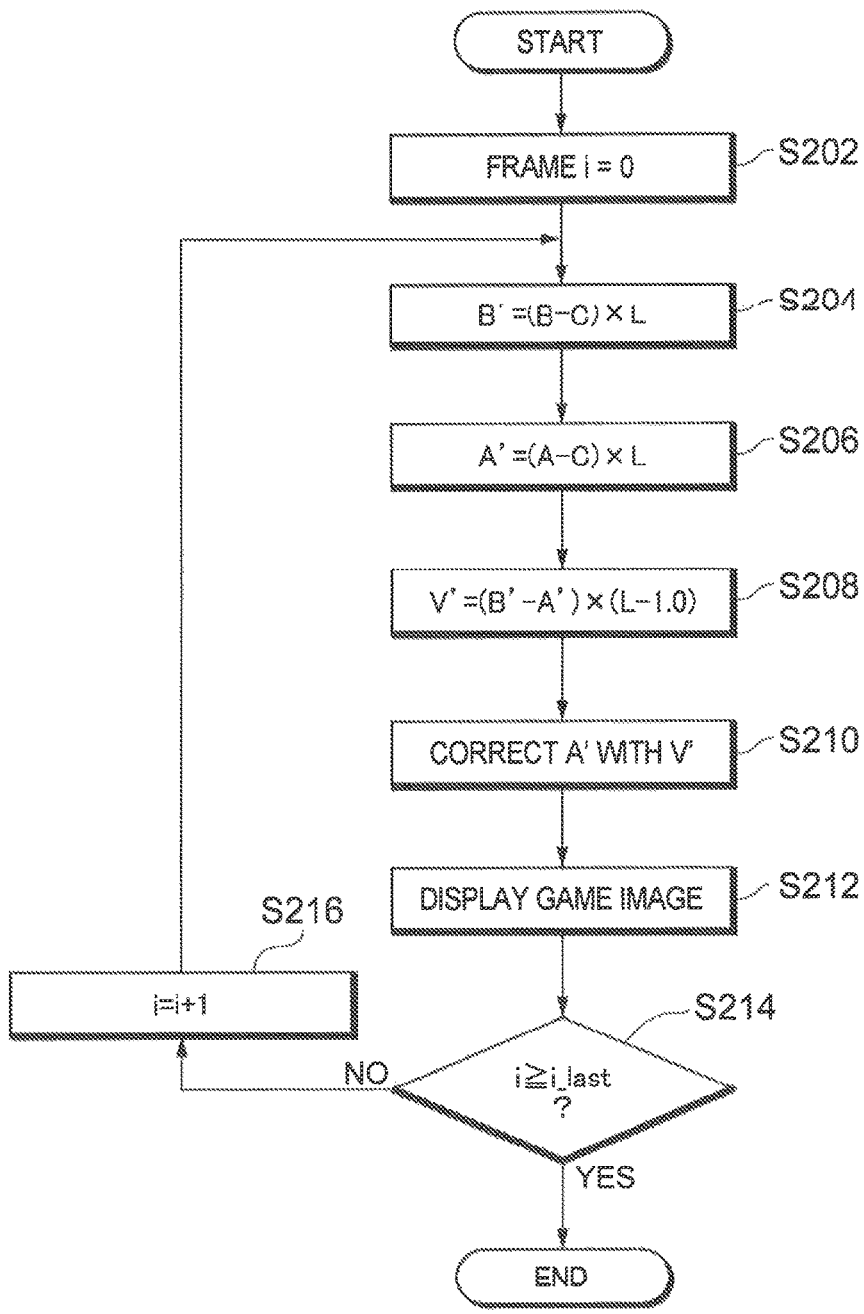
FIG. 15 is a flowchart showing an example of reproducing processing according to the embodiments, which is performed together with the correction of scrolling.

FIG. 15 is a flowchart showing one example of the reproduction processing performed together with the correction of scrolling. In step S202 in FIG. 15, the correction unit 160 sets frame i=0.

In step S204, the correction unit 160 calculates B'=(B−C)×L, as shown in Equation (1) described above.

In step S206, the correction unit 160 calculates A'=(A−C)×L, as shown in Equation (2) described above.

In step S208, the correction unit 160 calculates V'=(B'−A')×(L−1.0), as shown in Equation (4) described above.

In step S210, the correction unit 160 determines A", by correcting A' with V', as shown in Equation (5) described above.

In step S212, the scrolling unit 152 scrolls, regarding frame i, a part of the game image (scrolls the area displayed on the display screen) so that A" is located at the center of the display screen, and the reproduction unit 148 reproduces the game image so that the part of the game image after the scrolling is displayed.

In step S214, the correction unit 160 determines whether frame i is equal to or greater than i_last. If the result of the determination is "yes" (step S214: YES), the reproduction processing ends, and if the result of the determination is "no" (step S214: NO), the processing goes to step S216. The value i_last is the number of frames which is set for each music tune. As an alternative parameter for frame i, the number of seconds of each tune may be used.

In step S216, the correction unit 160 increments frame i. After that, the processing returns to step S204.

As described above, the present embodiment is configured to change the display scaling factor for the first path so as to accordingly increase the amusement of the game and, at the same time, to correct the first path or the second path so that the second object, which is moving along the first path with the changed display scaling factor, is displayed on the display screen. With this configuration, the present embodiment can prevent scrolling control which may lead to a failure of the game due to the second object not being visible on the display screen.

Furthermore, the present embodiment is configured so as to correct the second path to which the changed display scaling factor has been applied, so that the positional relationship between the first path and the second path does not change before and after the change of the display scaling factor. With this configuration, the present embodiment can control the scrolling without bringing an unnatural feeling to the player.

Furthermore, the present embodiment is configured so as to correct the second path to which the display scaling factor has been applied, in accordance with the positional relationship between a first point which is set on the first path for correction and a second point which is set on the second path for correction. With this configuration, appropriate correction for the scrolling can be performed with ease. Furthermore, the present embodiment is configured so as to define a first vector based on the first point and the second point, calculate a second vector by multiplying the first vector by a certain factor according to the display scaling factor, and use the obtained second factor to correct the second path. With this configuration, the scrolling can be controlled in a more appropriate manner.

Furthermore, the present embodiment is configured so as to change the display scaling factor for the first object in the display screen, and this configuration allows the player to select the size of the first object which is easier for the player to play.

Furthermore, the present embodiment is configured so as to evaluate the player's operation based on the operation content and the operation timing and to change the display scaling factor for the first path based on the result of such evaluation of the player's operation. With this configuration, the display scaling factor for the first path can be changed automatically depending on the player's operational tendencies.

Furthermore, according to the present embodiment, the moving speed of the operation timing mark increases (the game becomes more difficult) as the display scaling factor for the first path increases, and as a result, the amusement of the game can be further increased by setting a higher value for the score indicating the result of the evaluation of the player's operation.

Furthermore, according to the present embodiment, the operability for the player can be improved by changing the display scaling factor for the first object according to the change of the display scaling factor for the first path. For example, the space between the two adjacent first objects decreases with a decrease of the display scaling factor for the first path and the adjacent first objects may overlap with each other. Such overlap between the adjacent first objects can be eliminated by decreasing the display scaling factor for the first objects, and as a result, the player can easily view and identify each of the first objects. It should be noted here that, although the specific examples above describe examples of correcting the second path, the present embodiment may be modified to correct the first path in such a manner that the second object is displayed on the display screen.

Modifications

The technique disclosed in the present application has been described above by way of several embodiments thereof. However, the technique disclosed in the present application is not limited to those embodiments.

One or more different movement units may be provided in addition to the movement unit 150. Examples of such different movement unit include a second movement unit for setting a third path which serves as a judgment line in the same way as the first path.

Although the above-described embodiments describe the case in which the first path is displayed in the game image, the first path may not be displayed in the game image as long as the operation button marks 112 are displayed. In this case as well, the first path is set as a path on which the operation timing mark 114 moves.

The setting screens shown in FIG. 6 and FIG. 10 may be configured so that each setting can be made for each music tune and the player can save the content of such setting, thereby setting each of the operation contents for each tune to the player's liking. Moreover, for example, the angle of view (zooming angle) of the background in the game image may also be changed along with the change of the display scaling factor for the first path. With this configuration, the player can understand that the display scaling factor for the first path has been changed based on the size, etc., of the background image.

REFERENCE SIGNS UST

10 Portable game machine (game apparatus)
20 Operation unit
10 Music game program (game program)
148 Reproduction unit (reproduction function)
150 Movement unit
152 Scrolling unit
154 First change unit
156 Second change unit
160 Correction unit
162 Evaluation unit

What is claimed is:

1. A non-transitory computer-readable storage medium having stored therein game program instructions that, when executed by a computer, cause the computer to perform:
   a reproducing step for reproducing a part of a game image on a display screen, the part of the game image including a first path displayed therein with a first object arranged on the first path, the first object indicating to a player an operation content of the computer, the part of the game image also including a second object displayed therein, the second object moving along the first path with a passage of time and indicating to the player an operation timing of the operation content;
   a first changing step for changing a display scaling factor for the first path;
   a shifting step for shifting an area displayed on the display screen with the passage of time according to a second path; and
   a correcting step for correcting the first path or the second path so that the second object, which is moving along the first path with the changed display scaling factor, is displayed on the display screen.

2. The non-transitory computer-readable storage medium according to claim 1, wherein the correcting step includes:
   performing correction processing so that the positional relationship between a position of the first path and a position of the second path in the display screen does not change before and after the change of the display scaling factor.

3. The non-transitory computer-readable storage medium according to claim 2, wherein the correcting step includes:
   correcting the second path to which the display scaling factor has been applied, based on the positional relationship between a first point on the first path and a second point on the second path, the first point and the second point each being set for use in correction.

4. The non-transitory computer-readable storage medium according to claim 3, wherein the correcting step includes:
   defining a first vector based on the first point and the second point, multiplying the first vector by a factor according to the display scaling factor so as to obtain a second vector, and using the second vector to correct the second path.

5. The non-transitory computer-readable storage medium according to claim 1, further causing the computer to perform
   a second changing step for changing a display scaling factor for the first object in the display screen.

6. The non-transitory computer-readable storage medium according to claim 1, further causing the computer to perform
   an evaluating step for evaluating the player's operation based on the operation content and the operation timing,
   wherein the first changing step includes changing the display scaling factor for the first path according to a result of evaluation of the player's operation.

7. The non-transitory computer-readable storage medium according to claim 6, wherein the evaluating step includes
   awarding a higher score to indicate the result of evaluation as a higher display scaling factor is applied to the first path.

8. The non-transitory computer-readable storage medium according to claim 5, wherein the second changing step includes
   changing the display scaling factor for the first object according to the change of the display scaling factor for the first path.

9. A game apparatus comprising:
   an operation unit that receives an operation by a player;
   a reproduction unit that reproduces a part of a game image on a display screen, the part of the game image including a first path displayed therein with a first object arranged on the first path, the first object indicating to the player an operation content of the operation unit, the part of the game image also including a second object displayed therein, the second object moving along the first path with a passage of time and indicating to the player an operation timing of the operation content;
   a first changing unit that changes a display scaling factor for the first path;
   a shifting unit that shifts an area displayed on the display screen with the passage of time according to a second path; and
   a correction unit that corrects the first path or the second path so that the second object, which is moving along the first path with the changed display scaling factor, is displayed on the display screen.

* * * * *